United States Patent
Accisano, III et al.

(10) Patent No.: US 12,491,097 B2
(45) Date of Patent: Dec. 9, 2025

(54) SYSTEMS AND METHODS FOR COUPLING AND DECOUPLING A CATHETER

(71) Applicant: Merit Medical Systems, Inc., South Jordan, UT (US)

(72) Inventors: Nicholas Accisano, III, Howell, NJ (US); Kent C. Stalker, San Marcos, CA (US)

(73) Assignee: Merit Medical Systems, Inc., South Jordan, UT (US)

( * ) Notice: Subject to any disclaimer, the term of this patent is extended or adjusted under 35 U.S.C. 154(b) by 1226 days.

(21) Appl. No.: 17/337,187

(22) Filed: Jun. 2, 2021

(65) Prior Publication Data

US 2021/0378850 A1  Dec. 9, 2021

Related U.S. Application Data

(60) Provisional application No. 63/035,549, filed on Jun. 5, 2020.

(51) Int. Cl.
| | | |
|---|---|---|
| *A61F 2/95* | (2013.01) | |
| *A61M 27/00* | (2006.01) | |
| *A61F 2/04* | (2013.01) | |

(52) U.S. Cl.
CPC .............. *A61F 2/95* (2013.01); *A61M 27/00* (2013.01); *A61M 27/008* (2013.01);
(Continued)

(58) Field of Classification Search
CPC ...... A61F 2/95; A61F 2/82; A61F 2/04; A61F 2002/048; A61F 2002/047;
(Continued)

(56) References Cited

U.S. PATENT DOCUMENTS

| 818,817 A | 4/1906 | Leva |
|---|---|---|
| 3,996,938 A | 12/1976 | Clark, III |
| (Continued) | | |

FOREIGN PATENT DOCUMENTS

| CN | 2128148 | 3/1993 |
|---|---|---|
| CN | 2408894 | 12/2000 |
| (Continued) | | |

OTHER PUBLICATIONS

European Search Report dated May 31, 2024 for EP21818001.6.
(Continued)

*Primary Examiner* — Diane D Yabut
(74) *Attorney, Agent, or Firm* — Dorsey & Whitney LLP (57) ABSTRACT

A drainage stent delivery system is disclosed. The drainage stent delivery system includes a catheter body, a stent member, and a coupling member. In some embodiments the coupling member can include keyed connectors having a non-round shape to facilitate a 1:1 rotation ration of the catheter body and the stent member. In another embodiment, the coupling member can include a telescoping connector having an inner tube and a release wire disposed through the inner tube. A distal portion of the release wire has an outer diameter greater than an inner diameter of the inner tube such that the telescoping connector can be displace by the release wire. In another embodiment, the stent member includes a proximal retention member having arms that are outwardly extendable.

16 Claims, 9 Drawing Sheets

(52) U.S. Cl.
CPC . *A61F 2002/048* (2013.01); *A61F 2002/9511* (2013.01); *A61F 2210/0014* (2013.01); *A61F 2230/0008* (2013.01); *A61F 2230/0019* (2013.01); *A61F 2230/0021* (2013.01); *A61F 2230/0023* (2013.01); *A61F 2250/0065* (2013.01)

(58) Field of Classification Search
CPC ...... A61F 2002/9505; A61F 2002/9511; A61F 2002/9528; A61F 2002/041; A61F 2250/0063; A61M 27/008; A61M 27/002; A61M 25/04; A61M 25/0662; A61M 2025/0293; A61M 2025/0175; A61M 2025/004; A61M 2210/1078; A61B 2017/1205; A61B 2017/12054
See application file for complete search history.

(56) References Cited

U.S. PATENT DOCUMENTS

| | | | |
|---|---|---|---|
| 4,350,161 A | 9/1982 | Davis, Jr. | |
| 4,790,810 A | 12/1988 | Pugh, Jr. et al. | |
| 4,813,925 A | 3/1989 | Anderson, Jr. et al. | |
| 4,830,003 A | 5/1989 | Wolff et al. | |
| 4,913,683 A | 4/1990 | Gregory | |
| 4,957,479 A | 9/1990 | Roemer | |
| 4,963,129 A | 10/1990 | Rusch | |
| 5,002,560 A | 3/1991 | Machold et al. | |
| 5,019,090 A | 5/1991 | Pinchuk | |
| 5,071,407 A | 12/1991 | Termin et al. | |
| 5,122,136 A | 6/1992 | Guglielmi | |
| 5,221,253 A | 6/1993 | Coll | |
| 5,250,069 A | 10/1993 | Nobuyoshi et al. | |
| 5,259,847 A | 11/1993 | Trambert | |
| 5,282,784 A | 2/1994 | Willard | |
| 5,354,263 A | 10/1994 | Coll | |
| 5,364,340 A | 11/1994 | Coll | |
| 5,456,667 A | 10/1995 | Ham et al. | |
| 5,507,732 A | 4/1996 | Mcclure et al. | |
| 5,507,751 A | 4/1996 | Goode et al. | |
| 5,599,291 A | 2/1997 | Balbierz et al. | |
| 5,643,254 A | 7/1997 | Scheldrup et al. | |
| 5,653,684 A | 8/1997 | Laptewicz et al. | |
| 5,846,251 A | 12/1998 | Hart | |
| 5,876,417 A | 3/1999 | Devonec et al. | |
| 5,921,952 A | 7/1999 | Desmond, III et al. | |
| 5,964,771 A | 10/1999 | Beyar et al. | |
| 6,074,339 A | 6/2000 | Gambale et al. | |
| 6,196,996 B1 | 3/2001 | Teirstein | |
| 6,248,100 B1 | 6/2001 | De Toledo et al. | |
| 6,264,624 B1 | 7/2001 | Desmond, III et al. | |
| 6,319,287 B1 | 11/2001 | Frimberger | |
| 6,562,024 B2 | 5/2003 | De Toledo et al. | |
| 6,569,150 B2 | 5/2003 | Teague et al. | |
| 6,576,008 B2 | 6/2003 | Devonec et al. | |
| 6,629,981 B2 | 10/2003 | Dennis et al. | |
| 6,673,106 B2 | 1/2004 | Mitelberg et al. | |
| 6,676,651 B2 | 1/2004 | Haacke et al. | |
| 6,913,625 B2 | 7/2005 | Segura et al. | |
| 6,929,664 B2 | 8/2005 | Kolb et al. | |
| 6,949,125 B2 | 9/2005 | Robertson | |
| 6,991,614 B2 | 1/2006 | Mcweeney et al. | |
| 7,044,980 B2 | 5/2006 | Hammond et al. | |
| 7,044,981 B2 | 5/2006 | Liu et al. | |
| 7,169,139 B2 | 1/2007 | Teague et al. | |
| 7,217,250 B2 | 5/2007 | Kolb et al. | |
| 7,367,987 B2 | 5/2008 | Balgobin et al. | |
| 7,371,252 B2 | 5/2008 | Balgobin et al. | |
| 7,377,932 B2 | 5/2008 | Mitelberg et al. | |
| 7,550,002 B2 | 6/2009 | Goto et al. | |
| 7,566,316 B2 | 7/2009 | Mcguckin, Jr. et al. | |
| 7,722,604 B2 | 5/2010 | Brown, III et al. | |
| 7,731,676 B2 | 6/2010 | Maeda | |
| 7,811,305 B2 | 10/2010 | Balgobin et al. | |
| 7,824,367 B2 | 11/2010 | Accisano, III | |
| 7,901,444 B2 | 3/2011 | Slazas | |
| 7,901,704 B2 | 3/2011 | Richard | |
| 7,993,329 B2 | 8/2011 | Howell et al. | |
| 8,007,540 B2 | 8/2011 | Robertson | |
| 8,021,434 B2 | 9/2011 | Segura et al. | |
| 8,034,094 B2 | 10/2011 | Aoba et al. | |
| 8,070,825 B2 | 12/2011 | Devonec | |
| 8,298,276 B2 | 10/2012 | Ozawa et al. | |
| 8,333,000 B2 | 12/2012 | Huang et al. | |
| 8,333,796 B2 | 12/2012 | Tompkins et al. | |
| 8,603,185 B2 | 12/2013 | Shah et al. | |
| 8,657,884 B2 | 2/2014 | Smouse | |
| 8,676,349 B2 | 3/2014 | Stalker et al. | |
| 8,702,784 B2 | 4/2014 | Weisman et al. | |
| 8,753,303 B2 | 6/2014 | Weisman et al. | |
| 8,771,335 B2 | 7/2014 | Griego et al. | |
| 8,961,518 B2 | 2/2015 | Taylor et al. | |
| 8,961,581 B2 | 2/2015 | Hollett et al. | |
| 8,979,824 B2 | 3/2015 | Amos et al. | |
| 8,986,364 B2 | 3/2015 | Okuma | |
| 9,026,229 B2 | 5/2015 | Stalker et al. | |
| 9,186,151 B2 | 11/2015 | Tompkins et al. | |
| 9,265,637 B2 | 2/2016 | Weisman et al. | |
| 9,308,359 B2 | 4/2016 | Ward | |
| 9,314,359 B2 | 4/2016 | Windheuser et al. | |
| 9,387,312 B2 | 7/2016 | Smouse et al. | |
| 9,510,962 B2 | 12/2016 | Aoba et al. | |
| 9,517,120 B2 | 12/2016 | Devonec et al. | |
| 9,597,207 B2 | 3/2017 | Weisman et al. | |
| 9,956,100 B2 | 5/2018 | Smouse et al. | |
| 2003/0069533 A1 | 4/2003 | Kakutani et al. | |
| 2003/0163204 A1 | 8/2003 | Rix | |
| 2003/0191450 A1* | 10/2003 | Teague | A61M 27/002 604/524 |
| 2003/0195456 A1 | 10/2003 | Robertson | |
| 2004/0073283 A1 | 4/2004 | Ewers | |
| 2004/0098105 A1 | 5/2004 | Stinson et al. | |
| 2004/0181186 A1 | 9/2004 | Gellman et al. | |
| 2004/0249343 A1 | 12/2004 | Cioanta | |
| 2005/0085892 A1 | 4/2005 | Goto et al. | |
| 2007/0078446 A1 | 4/2007 | Lavelle et al. | |
| 2007/0112420 A1 | 5/2007 | Laduca | |
| 2007/0219612 A1 | 9/2007 | Andreas et al. | |
| 2007/0233223 A1 | 10/2007 | Styrc et al. | |
| 2007/0276466 A1 | 11/2007 | Lavelle et al. | |
| 2008/0109059 A1 | 5/2008 | Gordon et al. | |
| 2008/0140101 A1 | 6/2008 | Carley | |
| 2008/0221554 A1 | 9/2008 | O'Connor et al. | |
| 2009/0048654 A1 | 2/2009 | Chmura et al. | |
| 2009/0088833 A1 | 4/2009 | Soetermans | |
| 2009/0099640 A1 | 4/2009 | Weng | |
| 2009/0105719 A1 | 4/2009 | Honey et al. | |
| 2009/0248169 A1 | 10/2009 | Li | |
| 2009/0312829 A1 | 12/2009 | Aoba et al. | |
| 2010/0070047 A1 | 3/2010 | Smouse | |
| 2010/0185271 A1 | 7/2010 | Zhang | |
| 2010/0268201 A1 | 10/2010 | Tieu et al. | |
| 2011/0009950 A1 | 1/2011 | Grandfield et al. | |
| 2011/0077622 A1 | 3/2011 | Weisman et al. | |
| 2011/0130821 A1 | 6/2011 | Styrc | |
| 2011/0190862 A1 | 8/2011 | Bashiri et al. | |
| 2011/0196410 A1 | 8/2011 | Besselink et al. | |
| 2011/0196507 A1 | 8/2011 | St. Pierre | |
| 2011/0201887 A1* | 8/2011 | Greenblatt | A61M 25/0021 600/130 |
| 2011/0282249 A1 | 11/2011 | Tsoref et al. | |
| 2011/0282429 A1 | 11/2011 | Shin et al. | |
| 2011/0288624 A1 | 11/2011 | Roeder et al. | |
| 2011/0295265 A1 | 12/2011 | Hollett et al. | |
| 2011/0313404 A1 | 12/2011 | Amos et al. | |
| 2012/0041538 A1 | 2/2012 | White et al. | |
| 2012/0095567 A1 | 4/2012 | Weisman et al. | |
| 2012/0203325 A1 | 8/2012 | Weisman et al. | |
| 2012/0330397 A1 | 12/2012 | Harrison et al. | |
| 2013/0110042 A1 | 5/2013 | Humphreys et al. | |
| 2013/0245751 A1 | 9/2013 | Phung et al. | |
| 2014/0114431 A1 | 4/2014 | Yamagata | |
| 2014/0135941 A1 | 5/2014 | Smouse et al. | |

(56) References Cited

U.S. PATENT DOCUMENTS

| | | |
|---|---|---|
| 2014/0172065 A1 | 6/2014 | Lavelle et al. |
| 2014/0194970 A1 | 7/2014 | Chobotov |
| 2014/0200462 A1 | 7/2014 | Stalker et al. |
| 2014/0309721 A1 | 10/2014 | Griego et al. |
| 2015/0005864 A1 | 1/2015 | Okuma |
| 2015/0073525 A1 | 3/2015 | Aoba et al. |
| 2015/0157480 A1 | 6/2015 | Amos et al. |
| 2015/0223953 A1 | 8/2015 | Pendleton et al. |
| 2016/0015509 A1 | 1/2016 | Mcdonough |
| 2016/0045347 A1* | 2/2016 | Smouse ............... A61M 27/008 623/23.66 |
| 2016/0120675 A1 | 5/2016 | Weisman et al. |
| 2016/0135941 A1 | 5/2016 | Binmoeller et al. |
| 2016/0151615 A1 | 6/2016 | Overtoom |
| 2016/0184123 A1 | 6/2016 | Windheuser et al. |
| 2016/0287372 A1 | 10/2016 | Smouse et al. |
| 2016/0361167 A1 | 12/2016 | Tuval et al. |
| 2018/0325709 A1 | 11/2018 | Tatalovich et al. |
| 2021/0007870 A1 | 1/2021 | Smouse et al. |
| 2021/0322190 A1 | 10/2021 | Accisano, III |

FOREIGN PATENT DOCUMENTS

| | | | |
|---|---|---|---|
| CN | 201624817 | | 11/2010 |
| CN | 102548505 | | 7/2012 |
| CN | 102579171 | | 7/2012 |
| CN | 102596083 | | 7/2012 |
| CN | 202537720 | | 11/2012 |
| CN | 202637201 | | 1/2013 |
| CN | 103211671 | | 7/2013 |
| CN | 103876872 | | 6/2014 |
| CN | 103961194 | | 8/2014 |
| EP | 0806189 | A1 | 11/1997 |
| JP | 2002071765 | | 3/2002 |
| JP | 2003530165 | | 10/2003 |
| JP | 2009297502 | | 12/2009 |
| JP | 2012239803 | | 12/2012 |
| JP | 2015073547 | | 4/2015 |
| WO | 198805317 | | 7/1988 |
| WO | 199611721 | | 4/1996 |
| WO | 2013003450 | | 1/2013 |
| WO | 2015108609 | | 7/2015 |
| WO | 2016025434 | | 2/2016 |
| WO | 2016042150 | | 3/2016 |
| WO | 2018156650 | | 8/2018 |

OTHER PUBLICATIONS

Extended European Search Report dated May 3, 2024 for EP21788557.3.
Office Action dated Mar. 20, 2024 for U.S. Appl. No. 17/226,839.
Extended European Search Report dated Dec. 9, 2021 for EP21191048.4.
Office Action dated Feb. 10, 2022 for U.S. Appl. No. 15/901,833.
Office Action dated Mar. 4, 2022 for U.S. Appl. No. 15/958,406.
Office Action dated Aug. 17, 2021 for U.S. Appl. No. 15/958,406.
European Search Report dated May 19, 2020 for EP15831895.6.
European Search Report dated Sep. 7, 2017 for EP14878890.4.
European Search Report dated Dec. 22, 2017 for EP15831895.6.
European Search Report dated Dec. 22, 2020 for EP18758123.6.
International Search Report and Written Opinion dated Jan. 7, 2016 for PCT/US2015/44580.
International Search Report and Written Opinion dated Mar. 25, 2015 for PCT/US2014/063758.
International Search Report and Written Opinion dated Jun. 15, 2018 for PCT/US2018/19045.
International Search Report and Written Opinion dated Jul. 26, 2021 for PCT/US2021/026886.
Notice of Allowance dated Jan. 16, 2018 for U.S. Appl. No. 14/823,243.
Notice of Allowance dated Mar. 26, 2018 for U.S. Appl. No. 14/823,243.
Notice of Allowance dated Apr. 20, 2020 for U.S. Appl. No. 15/936,856.
Notice of Allowance dated Apr. 27, 2020 for U.S. Appl. No. 15/175,436.
Notice of Allowance dated May 13, 2016 for U.S. Appl. No. 14/159,221.
Notice of Allowance dated Oct. 9, 2013 for U.S. Appl. No. 12/559,946.
Office Action dated Jan. 3, 2012 for U.S. Appl. No. 12/559,946.
Office Action dated Jan. 10, 2020 for U.S. Appl. No. 15/936,856.
Office Action dated Feb. 5, 2021 for U.S. Appl. No. 15/901,833.
Office Action dated Feb. 12, 2020 for U.S. Appl. No. 15/901,833.
Office Action dated Feb. 26, 2016 for U.S. Appl. No. 14/159,221.
Office Action dated Apr. 18, 2017 for U.S. Appl. No. 14/823,243.
Office Action dated Apr. 21, 2021 for U.S. Appl. No. 15/958,406.
Office Action dated Apr. 22, 2020 for U.S. Appl. No. 15/958,406.
Office Action dated May 28, 2021 for U.S. Appl. No. 15/901,833.
Office Action dated Aug. 7, 2020 for U.S. Appl. No. 15/958,406.
Office Action dated Aug. 31, 2017 for U.S. Appl. No. 14/823,243.
Office Action dated Sep. 4, 2020 for U.S. Appl. No. 15/901,833.
Office Action dated Sep. 9, 2019 for U.S. Appl. No. 15/175,436.
Office Action dated Sep. 19, 2019 for U.S. Appl. No. 15/901,833.
Office Action dated Oct. 7, 2015 for U.S. Appl. No. 14/159,221.
Office Action dated Oct. 21, 2019 for U.S. Appl. No. 15/958,406.
Office Action dated Oct. 24, 2012 for U.S. Appl. No. 12/559,946.
Office Action dated Dec. 31, 2019 for U.S. Appl. No. 15/175,436.
Notice of Allowance dated Oct. 9, 2024 for U.S. Appl. No. 17/226,839.

* cited by examiner

SYSTEMS AND METHODS FOR COUPLING AND DECOUPLING A CATHETER

CROSS-REFERENCE TO RELATED APPLICATIONS

This application claims priority to U.S. Provisional Application No. 63/035,549, filed Jun. 5, 2020, and titled SYSTEMS AND METHODS FOR COUPLING AND DECOUPLING A CATHETER, which is hereby incorporated by reference in its entirety.

TECHNICAL FIELD

The present disclosure relates generally to devices and methods to selectively couple tubular members, particularly in medical devices. More specifically, the present disclosure relates to drainage stent delivery systems comprising a catheter and a drainage stent that can be percutaneously inserted into a patient, after which the drainage stent can be remotely decoupled from the catheter.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION

Drainage stents can be used to drain fluid from various cavities and/or organs within a patient. In certain instances, a drainage stent is a medical device used within a patient population that experience one or more complications associated with the urinary system, including the kidneys, ureters, and/or bladder. In some instances, complications may affect urinary flow and how these organs handle this function. These complications range from decreased urine flow to swelling of the kidneys or bladder. Many of these conditions are adversely impacted by the formation of kidney stones. To alleviate urinary system complications, a drainage stent delivery system may be used to deliver a ureteral stent to within the bladder, one or both of the kidneys, and/or one or both of the ureters.

In some embodiments, the stent delivery system can include a catheter body, a drainage stent member, and a coupling member. The coupling member is configured to selectively couple and decouple the drainage stent member from the catheter body. The coupling member is also configured to facilitate rotation of the catheter body and the stent member in a substantially 1:1 ratio, such as while the system is being delivered into a patient. In other words, when coupled, the catheter body and the stent member can be rotationally fixed. In certain embodiments, the coupling member can include a first or proximal connector coupled to a distal end of the catheter body, a distal or second connector coupled to a proximal end of the stent member, and a telescoping connector slidably coupled to the first and second connectors. In some embodiments the first, second, and telescoping connectors can include non-round shapes, such as oval, hexagonal, etc., to facilitate keying of the connectors when coupled together.

In another embodiment, the drainage stent delivery system can include a catheter body, a drainage stent member, and a coupling member. The coupling member is configured to selectively couple and decouple the stent member from the catheter body. The coupling member is also configured to facilitate rotation of the catheter body and the stent member in a substantially 1:1 ratio, such as while the system is being delivered into a patient. In other words, when coupled, the catheter body and the stent member can be rotationally fixed. In certain embodiments, the coupling member can include a first or proximal connector coupled to a distal end of the catheter body, a distal or second connector coupled to a proximal end of the stent member, a telescoping connector slidably coupled to the first and second connectors, a release wire, and a locking member. The release wire can be disposed through an inner tube of the telescoping connector and include an enlarged diameter distal portion having an outer diameter greater than an inner diameter of the inner tube.

In another embodiment, the drainage stent delivery system can include a catheter body, a stent member, and a coupling member. The stent member may include a proximal retention member configured to retain the stent member within a cavity (e.g., kidney) of a patient. The proximal retention member can include at least two laterally extendable protrusions or arms when the proximal retention member is in an expanded configuration. In some embodiments, the proximal retention member can include an insert configured to expand the proximal retention member from a straightened configuration to the expanded configuration.

In an exemplary use, the drainage stent delivery system can be percutaneously inserted into a patient's body such that a distal end of the drainage stent is positioned within the patient's bladder and the proximal end is positioned within the patient's kidney. A body of the stent member can be disposed in the patient's ureter between the kidney and the bladder. The stent member can be used to drain the kidney when there is a blockage or restriction of the ureter. Following a period of time, for example two weeks, to allow stabilization of the stent member, the catheter body may be remotely decoupled from the stent member, by retracting the release wire coupled to the telescoping connector, and removed from the patient without surgical intervention. The stent member may include retention features configured to retain the stent member in the kidney and bladder.

In other applications, the drainage stent delivery system may be used to drain bile from the patient's liver or gall bladder into the patient's small intestine, where the stent member is disposed within a blocked or restricted bile duct. In still other applications, the drainage stent delivery system may be used to drain any suitable organ of the patient where a natural drainage tube or duct is blocked or restricted. For example, the drainage stent delivery system may be used to drain fluid from a patient's cranial cavity, pericardial cavity, pleural cavity, etc.

Embodiments may be understood by reference to the drawings, wherein like parts are designated by like numerals throughout. It will be readily understood by one of ordinary skill in the art having the benefit of this disclosure that the components of the embodiments, as generally described and illustrated in the figures herein, could be arranged and designed in a wide variety of different configurations. Thus, the following more detailed description of various embodiments, as represented in the figures, is not intended to limit the scope of the disclosure, but is merely representative of various embodiments. While the various aspects of the embodiments are presented in drawings, the drawings are not necessarily drawn to scale unless specifically indicated.

It will be appreciated that various features are sometimes grouped together in a single embodiment, figure, or description thereof for the purpose of streamlining the disclosure. Many of these features may be used alone and/or in combination with one another.

The phrases "coupled to" and "in communication with" refer to any form of interaction between two or more entities, including mechanical, electrical, magnetic, electromagnetic, fluid, and thermal interaction. Two components may be coupled to or in communication with each other even though they are not in direct contact with each other. For example, two components may be coupled to or in communication with each other through an intermediate component.

The directional terms "distal" and "proximal" are given their ordinary meaning in the art. That is, the distal end of a medical device means the end of the device furthest from the practitioner during use. The proximal end refers to the opposite end, or the end nearest the practitioner during use. As specifically applied to the drainage stent delivery system, the proximal end of the system refers to the end that extends from the patient's body and the distal end refers to the opposite end, the end disposed within the patient's bladder. Thus, if at one or more points in a procedure the practitioner changes the orientation of the system, as used herein, the term "proximal end" always refers to the end of the system extending from the patient's body (even if the distal end is temporarily closer to the practitioner).

"Fluid" is used in its broadest sense, to refer to any fluid, including both liquids and gases as well as solutions, compounds, suspensions, etc., which generally behave as fluids.

FIGS. 1-7B illustrate different views of several drainage stent delivery systems and related components. In certain views each device may be coupled to, or shown with, additional components not included in every view. Further, in some views only selected components are illustrated, to provide detail into the relationship of the components. Some components may be shown in multiple views, but not discussed in connection with every view. Disclosure provided in connection with any figure is relevant and applicable to disclosure provided in connection with any other figure or embodiment.

Figure 1:
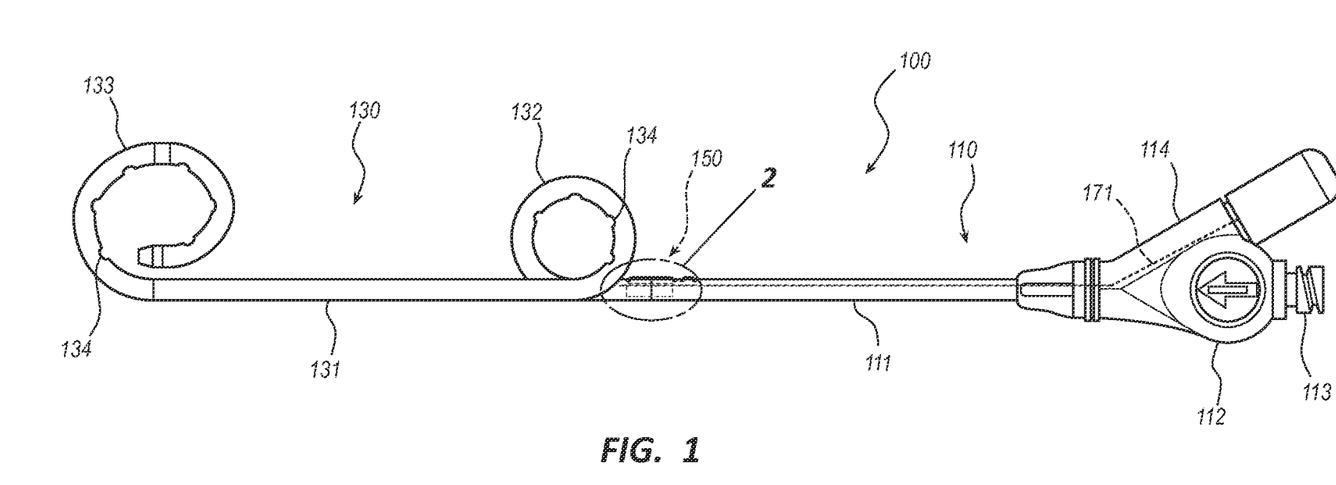
FIG. 1 is a side view of a portion of a drainage stent delivery system.
Figure 2:
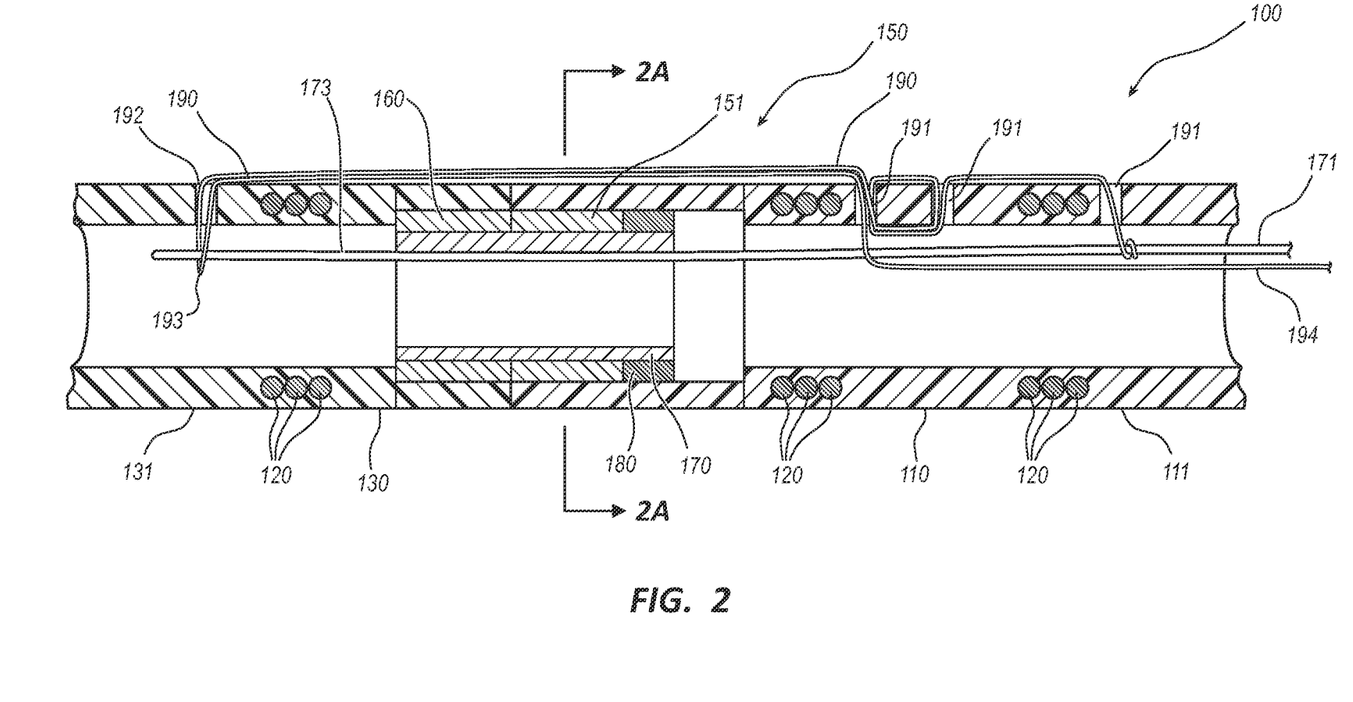
FIG. 2 is a cross-sectional side view of the drainage stent delivery system of FIG. 1 including a coupling member.
Figure 2A:
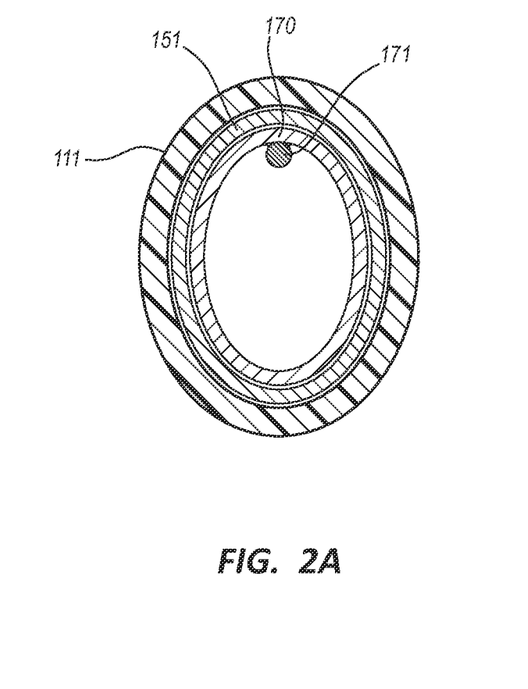
FIG. 2A is a cross-sectional end view of an embodiment of the coupling member of FIG. 2.
Figure 2B:
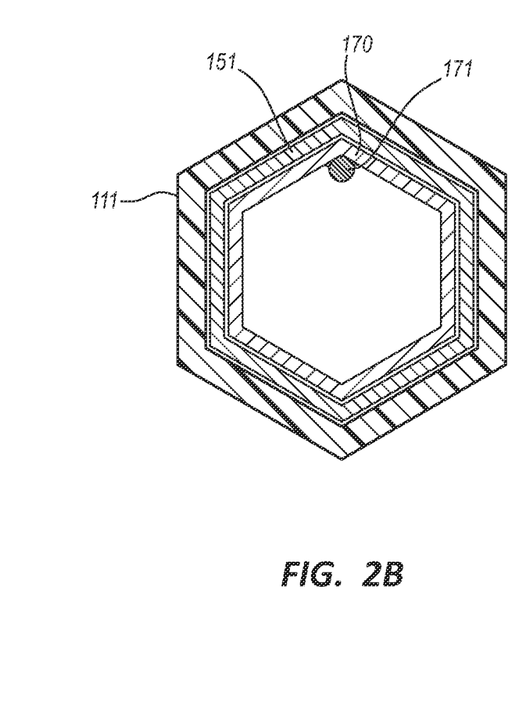
FIG. 2B is a cross-sectional end view of another embodiment of the coupling member of FIG. 2.

FIGS. 1-2B depict one embodiment of a drainage stent delivery system 100. In the illustrated embodiment of FIG. 1, the drainage stent delivery system 100 is partially comprised of a proximal member or catheter body 110, a distal member or stent member 130, and a coupling member 150. The stent member 130 is configured to facilitate drainage of a cavity of an organ of a patient. For example, the stent member 130 of the illustrated embodiment may be configured to provide a drainage channel from a patient's kidney to the patient's bladder when the patient's ureter is blocked or restricted.

As further depicted in the embodiment of FIG. 1, the catheter body 110 includes an elongate tubular member 111. A hub 112 is coupled to a proximal end of the tubular member 111. The hub 112 can include a central port 113 and a side port 114. In other embodiments, the hub 112 may include three, four, or more ports. The central port 113 is in fluid communication with a lumen of the tubular member 111 and is configured for passage of an elongate medical instrument (e.g., guidewire) used to insert the drainage stent delivery system 100 into a patient. Additionally, the central port 113 can be used to deliver fluid into the patient and/or to drain fluid from the patient (e.g., bile, urine from kidney and/or bladder, etc.). The tubular member 111 may be formed from any suitable material. For example, the tubular member 111 can be formed from polymeric materials, including, but not limited to, polyurethane, polyethylene, polypropylene, nylon, etc. In certain embodiments, the tubular member 111 includes a composite material. The tubular member 111 can also be reinforced with one or more braids and/or coils of various materials, including, but not limited to, stainless steel, nitinol, or elgiloy, etc. A length of the tubular member 111 may range from about 10 cm to about 100 cm, or from about 20 cm to about 60 cm, and an outer diameter may range from about 6 Fr to about 16 Fr. In some embodiments, the tubular member 111 can include a radiopaque agent or radiopaque bands to facilitate visualization and positioning of the catheter body 110 within the patient. For example, the tubular member 111 can also include one or more radiopaque agents or fillers, such as barium, bismuth, or tungsten. The tubular member 111 can also include radiopaque bands or markers comprising gold, platinum, and/or platinum-iridium, etc.

In the depicted embodiment of FIG. 1, the stent member 130 includes a tubular body 131. The tubular body 131 may be formed from any suitable material. For example, the tubular body 131 can be formed from polymeric materials, including, but not limited to, polyurethane, polyethylene, polypropylene, nylon, etc. In certain embodiments, the tubular body 131 includes a composite material. The tubular body 131 can also be reinforced with one or more braids and/or coils of various materials, including, but not limited to, stainless steel, nitinol, or elgiloy, etc. A length of the tubular body 131 may range, depending on the use, from about 20 cm to about 120 cm, from about 18 cm to about 30 cm, from about 5 cm to about 18 cm, or from about 3 cm to about 18 cm, and an outer diameter may range from about 6 Fr to about 16 Fr. The tubular body 131 can also be tapered at the distal and/or proximal if desired. In some embodiments, the tubular body 131 can include a radiopaque agent or radiopaque bands to facilitate visualization and positioning of the tubular body 131 within the patient. For example, the tubular body 131 can also include one or more radiopaque agents or fillers, such as barium, bismuth, or tungsten. The tubular body 131 can also include radiopaque bands or markers comprising gold, platinum, and/or platinum-iridium, etc.

When the stent member 130 is in an unrestricted state, as shown in FIG. 1, the tubular body 131 includes a first or proximal retention member 132 and a second or distal retention member 133. For example, the retention members 132, 133 may be shaped as loops or pigtails disposed adjacent proximal and distal ends of the tubular body 131. In other embodiments, the retention members 132, 133 may be in the form of other expandable features, such as balloons, wings, etc. In the depicted embodiment, the retention members 132, 133 may be pre-formed (e.g., using heat) in the shape of loops or pigtails such that when the guidewire is removed from the stent member 130 during the insertion procedure, the retention members 132, 133 automatically transition from a straightened state to the unrestricted state shown in FIG. 1. In other embodiments, one or more of the retention members 132, 133 may include a shape memory insert (e.g., a metal or metal alloy) configured to transition the retention members 132, 133 from the straightened state to the unrestricted state. In still other embodiments, a tether (e.g., suture) may be releasably coupled to the proximal retention member 132 and/or the distal retention member 133 to facilitate transitioning of the proximal retention member 132 and/or the distal retention member 133 from the straightened state to the unrestricted state. In the depicted embodiment, the stent member 130 also includes a plurality of drainage ports 134 disposed adjacent the retention members 132, 133.

As depicted in the embodiment of FIG. 1, the coupling member 150 selectively couples a distal end of the catheter body 110 to a proximal end of the stent member 130. As illustrated in FIGS. 2-2B, the coupling member 150 includes a first or proximal connector 151, a second or distal connector 160, and a telescoping connector 170. The connectors 151, 160, 170 may be formed from any suitable material, such as metals and metal alloys including, but not limited to, stainless steel, titanium, nickel-titanium alloy, etc. In the illustrated embodiment, the connectors 151, 160, 170 are hollow cylinders or structures having a non-round shape. In other words, the connectors 151, 160, 170 have a cross-sectional shape that is non-round, or a lumen that is non-round. For example, the non-round shape can be an oval shape as shown in FIG. 2A, an egg shape, a tear drop shape, a polygonal shape, etc. Exemplary polygonal shapes can be triangular shapes, rectangular shapes, square shapes, pentagonal shapes, hexagonal shapes as shown in FIG. 2B, etc. Other shapes facilitating keying of the connectors 151, 160, 170 together are also contemplated within the scope of this disclosure.

The first connector 151 is fixedly coupled to a distal end of and disposed within a lumen of the tubular member 111 of the catheter body 110. The second connector 160 is fixedly coupled to a proximal end and disposed within a lumen of the tubular body 131 of the stent member 130. Outer and inner diameters of the first and second connectors 151, 160 can be substantially equivalent. The non-round shapes of the first and second connectors 151, 160 can also be substantially equivalent. The telescoping connector 170 is sized to be slidingly disposed within bores or lumens of the first and second connectors 151, 160. The non-round shape of the telescoping connector 170 is complimentary to or substantially the same as the non-round shapes of the first and second connectors 151, 160 such that the connectors 151, 160, 170 can be rotationally fixed, locked or keyed together to allow for a 1:1 axial rotation of the stent member 130 with the catheter body 110. Said another way, when the catheter body 110 is axially rotated during insertion of the drainage stent delivery system 100 into a cavity of the patient to position the stent member 130 in a desired location, the stent member 130 is rotated equally and simultaneously with the catheter body 110 due to the rotational fixing, locking, or keying of the first and second connectors 151, 160 by the telescoping connector 170.

The drainage stent delivery system 100 may be utilized to drain urine from the patient's kidney into the bladder when the patient's ureter is blocked or restricted. In some embodiments, the drainage stent delivery system 100 may be used to drain bile from the patient's liver or gall bladder into the patient's small intestine, where the stent member 130 is disposed within a blocked or restricted bile duct. In other embodiments, the drainage stent delivery system 100 may be utilized to drain any suitable body cavity, such as the cranial cavity, the pericardial cavity, the pleural cavity, etc.

In the illustrated embodiment of FIG. 2, the coupling member 150 may further include a coupling locking member 190 (e.g., suture, flexible wire, etc.) coupled to the catheter body 110 and releasably coupled to the stent member 130 and a distal portion 173 of the release wire 171. For example, the locking member 190 can be fixedly coupled to the catheter body 110 at locking member holes 191 disposed through a wall of the tubular member 111 and positioned proximal to the connectors 151, 160, 170. Alternatively, the locking member can be releasably coupled to the catheter body 110. A portion of the locking member 190 can also optionally be coupled to a proximal portion of the release wire 171. The locking member 190 can be releasably coupled to the stent member 130 at a loophole 192 disposed through a wall of a tubular body 131 and positioned distal to the connectors 151, 160, 170. For instance, a loop 193 of the locking member 190 can releasably couple the locking member 190 to the distal portion 173 of the release wire 171.

FIG. 2 shows a portion of the drainage stent delivery system 100 in a coupled configuration. As illustrated, the distal end of the catheter body 110 is adjacent the proximal end of the stent member 130, the first connector 151 is adjacent the second connector 160, and the telescoping connector 170 is disposed within the first and second connectors 251, 260. Additionally, the release wire 171 is disposed through the telescoping connector 170 and the distal portion 173 is positioned distal of the telescoping connector 170. As depicted, the locking member 190 is fixedly coupled to the catheter body 110 at the locking member holes 191 and releasably coupled to the stent member 130 at the loophole 192. A portion of the distal portion 173 passes through the loop 193. Tension can be applied to a proximally extending portion 194 of the locking member 190 such that the catheter body 110 and the stent member 130 are securely coupled together. Reinforcement coils 120 may be disposed within the wall of the tubular member 111 and tubular body 131 adjacent the locking member holes 191 and the loophole 192 to prevent the locking member 190 from tearing through the walls.

When the catheter body 110 and the stent member 130 are decoupled, the release wire 171 is displaced proximally, causing the distal portion 173 to be displaced proximally and to displace the telescoping connector 170 (which can be coupled to the release wire 171) proximally until a stop member 180 (which is coupled to the telescoping connector 170) abuts an internal shoulder of the catheter body 110.

This allows the distal end of the catheter body 110 to be displaced away from the proximal end of the stent member 130, the first connector 151 to be displaced away from the second connector 160, and the telescoping connector 170 to be displaced proximally and disposed, at least partially within, the first connector 151. The distal portion 173 is displaced proximally and pulled out of the loop 193. Tension may be applied to the proximally extending portion 194 of the locking member 190, pulling the loop 193 through the loophole 192 such that the catheter body 110 and the stent member 130 are decoupled from one another.

Figure 3:
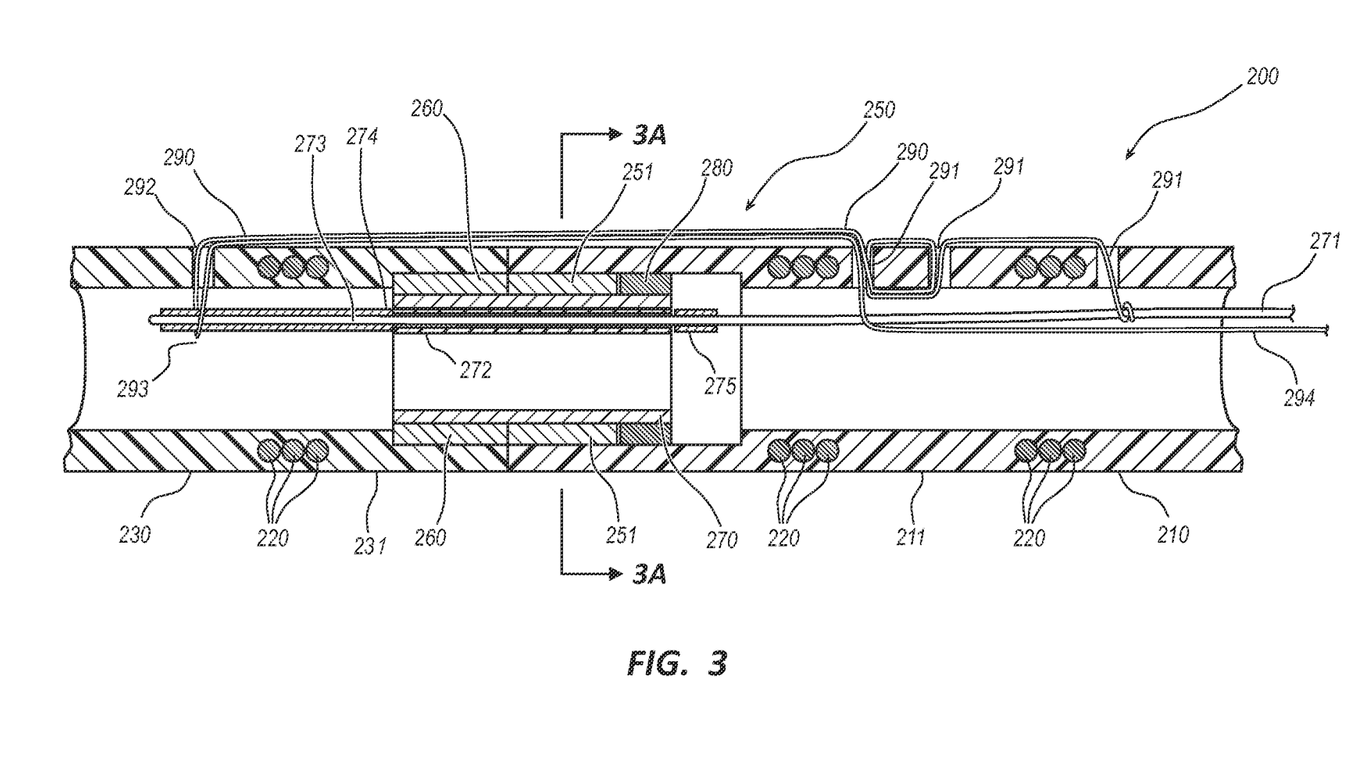
FIG. 3 is a cross-sectional side view of another embodiment of the coupling member of FIG. 1 in a coupled configuration.
Figure 4:
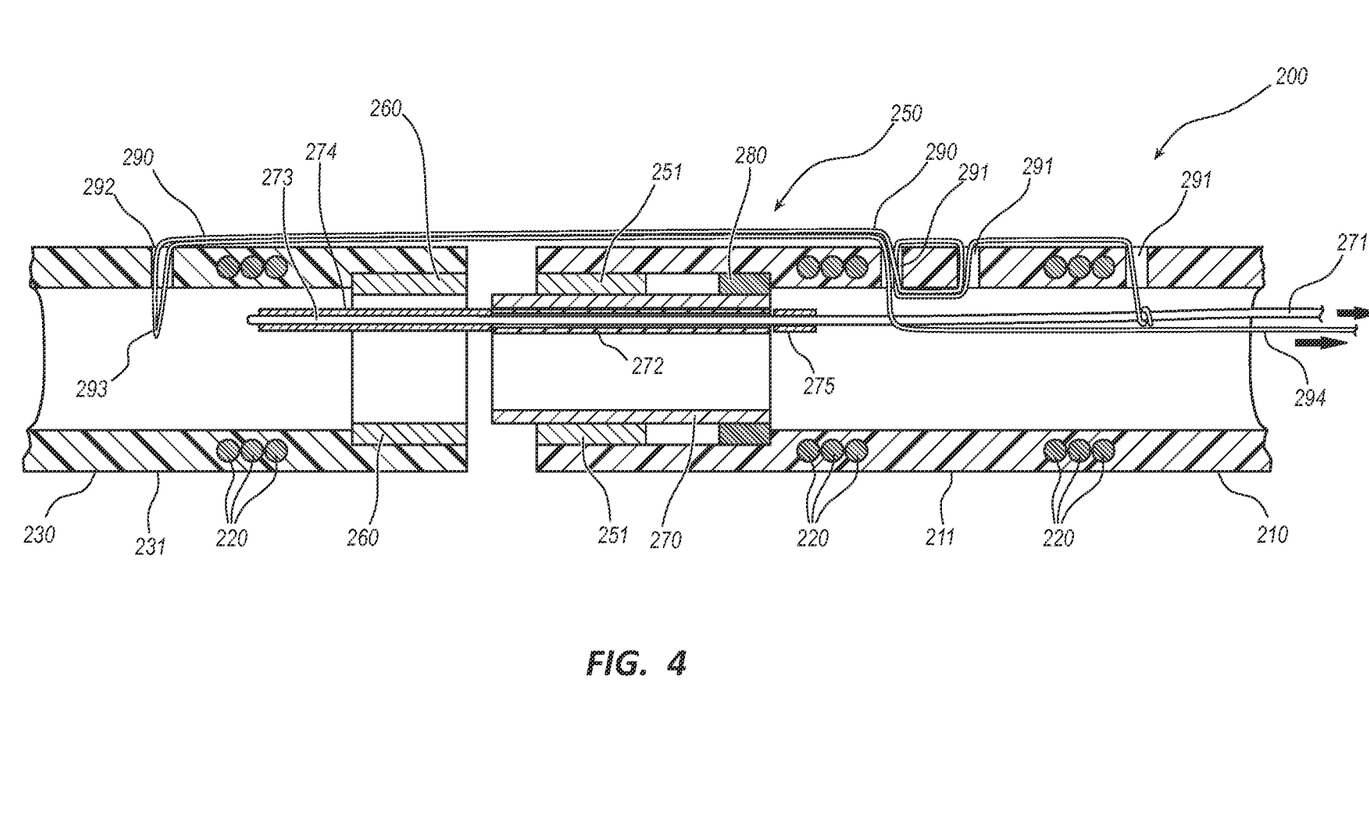
FIG. 4 is a cross-sectional view of the coupling member of FIG. 3 in a decoupled configuration.

FIGS. 3-4 depict an embodiment of a drainage stent delivery system 200 that resembles the drainage stent delivery system 100 described above in certain respects. Accordingly, like features are designated with like reference numerals, with the leading digit incremented to "2." For example, the embodiment depicted in FIGS. 3-4 includes a coupling member 250 that may, in some respects, resemble the coupling member 150 of FIG. 2. Relevant disclosure set forth above regarding similarly identified features thus may not be repeated hereafter. Moreover, specific features of the drainage stent delivery system 100 and related components shown in FIGS. 1-2B may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the drainage stent delivery system 200 and related components depicted in FIGS. 3-4. Any suitable combination of the features, and variations of the same, described with respect to the drainage stent delivery system 100 and related components illustrated in FIGS. 1-2B can be employed with the drainage stent delivery system 200 and related components of FIGS. 3-4, and vice versa. This pattern of disclosure applies equally to further embodiments depicted in subsequent figures and described hereafter, wherein the leading digits may be further incremented.

FIGS. 3-4 illustrate the coupling member 250 of the drainage stent delivery system 200. The coupling member 250 includes a first or proximal connector 251, a second or distal connector 260, and a telescoping connector 270. The connectors 251, 260, 270 may be formed from any suitable material, such as metals and metal alloys including, but not limited to, stainless steel, titanium, nickel-titanium alloy, etc. The connectors 251, 260, 270 are hollow cylinders or structures. The first connector 251 is fixedly coupled to a distal end of and disposed within a lumen of a catheter body 210. The second connector 260 is fixedly coupled to a proximal end and disposed within a lumen of a stent member 230. Outer and inner diameters of the first and second connectors 251, 260 are substantially equivalent. The telescoping connector 270 is sized to be slidingly disposed within bores or lumens of the first and second connectors 251, 260.

Figure 3A:
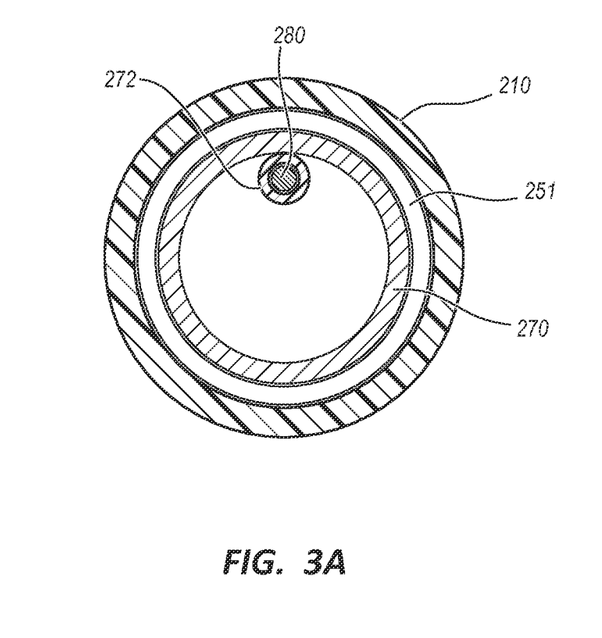
FIG. 3A is a cross-sectional end view of the coupling member of FIG. 3.
Figure 3B:
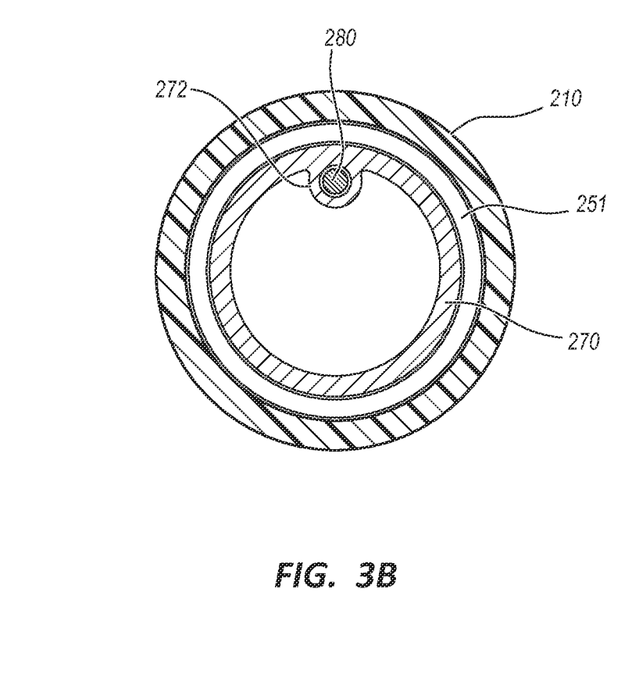
FIG. 3B is a cross-sectional end view of another embodiment of the coupling member of FIG. 3.

An inner cannula or tube 272 is fixedly coupled to and disposed within the bore of the telescoping connector 270 as shown in FIG. 3A. In other embodiments, the inner tube 272 may be a second lumen or bore of the telescoping connector 270 as shown in FIG. 3B. The inner tube 272 may comprise any suitable material, such as metals and metal alloys including, but not limited to, stainless steel, titanium, nickel-titanium alloy, etc. The inner tube 272 may be fixedly coupled to the telescoping connector 270 using any suitable technique, such as welding, soldering, brazing, gluing, heat fusing, etc.

A bore or lumen of the inner tube 272 is sized to slidingly receive a release wire 271. A distal portion 273 of the release wire 271 extends distally from the inner tube 272 and the telescoping connector 270. The distal portion 273 is shown to have an outer diameter that is larger than an inner diameter of the inner tube 272 such that the release wire 280 is restricted from proximal displacement relative to the inner tube 272 and the telescoping connector 270. As depicted, the distal portion 273 may include a cannula or tube 274 coupled to the distal portion 273 wherein an outer diameter of the tube 274 is larger than the lumen of the inner tube 272. In another embodiment, a diameter of the release wire 271 proximal to the inner tube 272 may be reduced by stretching, etching, grinding, etc. In other embodiments, the distal portion 273 may include a bulge, a kink, a bead, etc.

A retention band 275 may be fixedly coupled to the release wire 271 proximal of the inner tube 272. An outer diameter of the retention band 275 can be larger than the inner diameter of the inner tube 272 such that the release wire 280 is restricted from distal displacement relative to the inner tube 272 and the telescoping connector 270.

In the illustrated embodiment of FIG. 3, the coupling member 250 may further include a coupling locking member 290 (e.g., suture, flexible wire, etc.) coupled to the catheter body 210 and releasably coupled to the stent member 230 and the release wire 271. The locking member 290 can be fixedly coupled to the catheter body 210 at locking member holes 291 disposed through a wall of a tubular member 211 and positioned proximal to the connectors 251, 260, 270. The locking member 290 can be releasably coupled to the stent member 230 at a loophole 292 disposed through a wall of a tubular body 231 and positioned distal to the connectors 251, 260, 270. A loop 293 of the locking member 290 can releasably couple the locking member 290 to the distal portion 273 of the release wire 271. A portion of the locking member 290 can be coupled to a proximal portion of the release wire 271.

FIG. 3 shows a portion of the drainage stent delivery system 200 in a coupled configuration. As illustrated, the distal end of the catheter body 210 is adjacent the proximal end of the stent member 230, the first connector 251 is adjacent the second connector 260, and the telescoping connector 270 is disposed within the first and second connectors 251, 260. Additionally, the release wire 271 is disposed through the inner tube 272 and the distal portion 273 is positioned distal of the inner tube 272 and the telescoping connector 270. As depicted, the locking member 290 is fixedly coupled to the catheter body 210 at the locking member holes 291 and releasably coupled to the stent member 230 at the loophole 292. Alternatively, the locking member 290 can be releasably coupled to the catheter body 230. A portion of the distal portion 273 passes through the loop 293. Tension is applied to a proximally extending portion 294 of the locking member 290 such that the catheter body 210 and the stent member 230 are securely coupled together. Reinforcement coils 220 may be disposed within the walls of the tubular member 211 and tubular body 231 adjacent the locking member holes 291 and the loophole 292 to prevent the locking member 290 from tearing through the walls.

FIG. 4 shows a portion of the drainage stent delivery system 200 in a decoupled configuration. The release wire 271 is displaced proximally causing the distal portion 273 to engage with the inner tube 272 to displace the telescoping connector 270 proximally until a stop member 280 (which is coupled to the telescoping connector 270) abuts an internal shoulder of the catheter body 210. As illustrated, this allows the distal end of the catheter body 210 to be displaced away from the proximal end of the stent member 230, the first connector 251 to be displaced away from the second connector 260, and the telescoping connector 270 to be displaced proximally and at least partially disposed within the first connector 251. The distal portion 273 is displaced proximally and pulled out of the loop 293. Tension may be applied to the proximally extending portion 294 of the locking member 290 pulling the loop 293 through the loophole 292 such that the catheter body 210 and the stent member 230 are decoupled from one another.

FIGS. 5-7B depict another embodiment of a drainage stent delivery system 300. In the illustrated embodiment of FIG. 5, the drainage stent delivery system 300 is partially comprised of a proximal member or catheter body 310, a distal member or stent member 330, and a coupling member 350. It will be appreciated that any of the above-identified coupling members 150, 250 and associated coupling components could be used. The stent member 330 may be configured to facilitate drainage of a cavity of an organ of a patient. For example, the stent member 330 of the illustrated embodiment is configured to provide a drainage channel from a patient's kidney to the patient's bladder when the patient's ureter is blocked or restricted.

Figure 5:
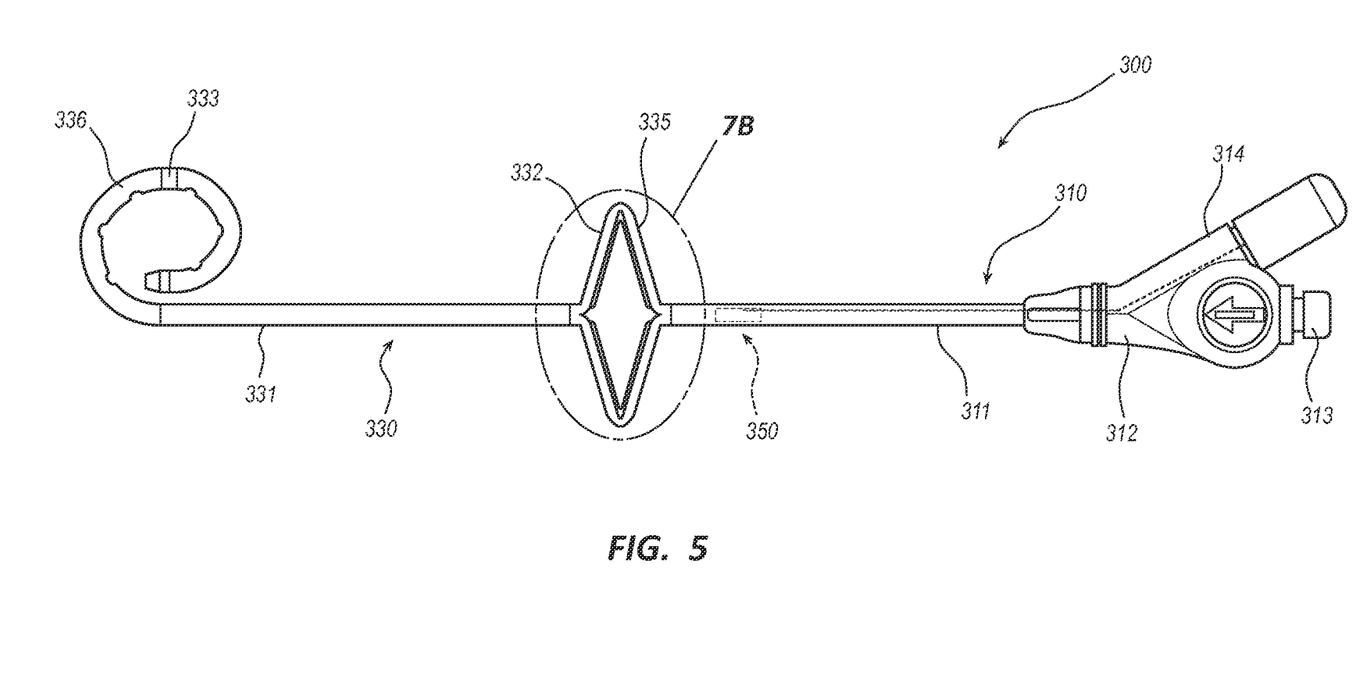
FIG. 5 is a side view of another embodiment of a drainage stent delivery system.

As further depicted in the embodiment of FIG. 5, the catheter body 310 includes an elongate tubular member 311. A hub 312 is coupled to a proximal end of the tubular member 311. The hub 312 can include a central port 313 and a side port 314. In other embodiments, the hub 312 may include three, four, or more ports. The central port 313 is in fluid communication with a lumen of the tubular member 311 and is configured for passage of an elongate medical instrument (e.g., guidewire) used to insert the drainage stent delivery system 300 into a patient. Additionally, the central port 313 can be used to deliver fluid into the patient and/or to drain fluid from the patient (e.g., bile, urine from kidney and/or bladder). The tubular member 311 may be formed from any suitable material. For example, the tubular member 311 can be formed from polymeric materials, including, but not limited to, polyurethane, polyethylene, polypropylene, nylon, etc. In certain embodiments, the tubular member 311 includes a composite material. The tubular member 111 can also be reinforced with one or more braids and/or coils of various materials, including, but not limited to, stainless steel, nitinol, or elgiloy, etc. A length of the tubular member 311 may range from about 10 cm to about 100 cm, or from about 20 cm to about 60 cm, and an outer diameter may range from about 6 Fr to about 16 Fr. In some embodiments, the tubular member 311 can include a radiopaque agent or radiopaque bands to facilitate visualization and positioning of the catheter body 310 within the patient. For example, the tubular member 311 can also include one or more radiopaque agents or fillers, such as barium, bismuth, or tungsten. The tubular member 311 can also include radiopaque bands or markers comprising gold, platinum, and/or platinum-iridium, etc.

In the depicted embodiment of FIG. 5, the stent member 330 includes a tubular body 331. The tubular body 331 may be formed from any suitable material. For example, the tubular body 331 can be formed from polymeric materials, including, but not limited to, polyurethane, polyethylene, polypropylene, nylon, etc. In certain embodiments, the tubular body 331 includes a composite material. The tubular body 331 can also be reinforced with one or more braids and/or coils of various materials, including, but not limited to, stainless steel, nitinol, or elgiloy, etc. A length of the tubular body 331 may range, depending on the use, from about 20 cm to about 120 cm, from about 18 cm to about 30 cm, from about 5 cm to about 18 cm, or from about 3 cm to about 18 cm, and an outer diameter may range from about 6 Fr to about 16 Fr. The tubular body 331 can also be tapered at the distal and/or proximal end if desired. In some embodiments, the tubular body 331 can include a radiopaque agent or radiopaque bands to facilitate visualization and positioning of the tubular body 331 within the patient. For example, the tubular body 331 can also include one or more radiopaque agents or fillers, such as barium, bismuth, or tungsten. The tubular body 331 can also include radiopaque bands or markers comprising gold, platinum, and/or platinum-iridium, etc.

The stent member 330, as shown in FIG. 5, includes a proximal retention member 332 and a distal retention member 333. As depicted, the distal retention member 333 includes a loop or pigtail 336 and the proximal retention member 332 includes laterally extendable protrusions or arms 335. In other embodiments, both retention members 332, 333 may include any combination of pigtails 336 and/or protrusions 335.

Figure 6A:
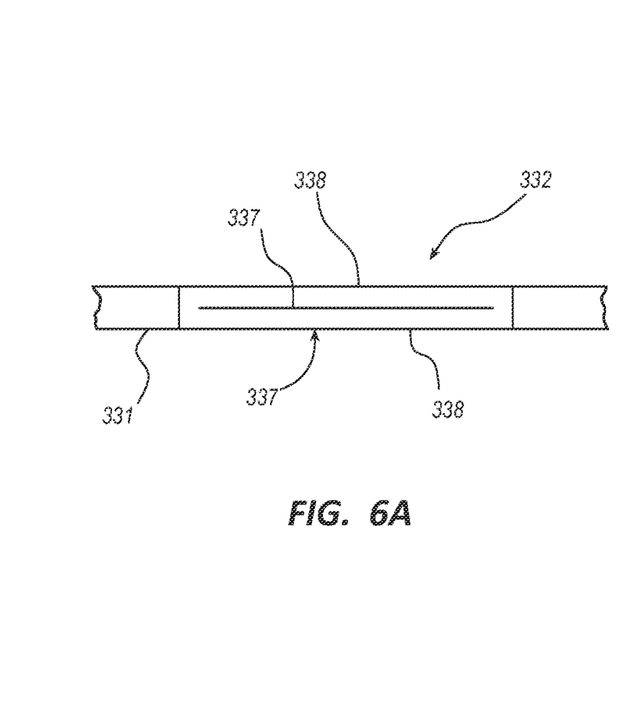
FIG. 6A is a side view of a portion of the drainage stent delivery system of FIG. 5 with a proximal retention member in a straightened configuration.
Figure 6B:
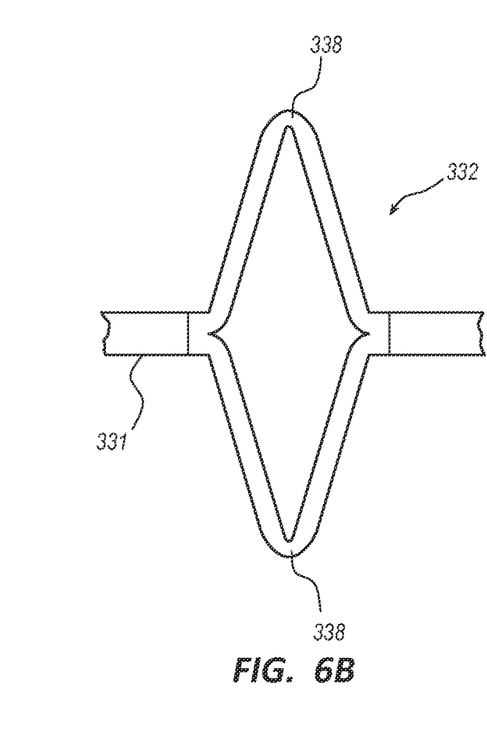
FIG. 6B is a side view of the portion of the drainage stent delivery system of FIG. 6A with the proximal retention member in an expanded configuration.
Figure 6C:
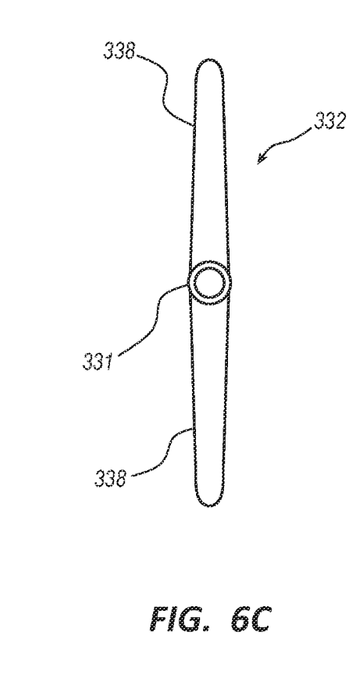
FIG. 6C is an end view of the portion of the drainage stent delivery system of FIG. 6A with the proximal retention member in an expanded configuration.

FIG. 6A illustrates the proximal retention member 332 in a straightened configuration, and FIGS. 6B and 6C illustrate the proximal retention member 332 in an expanded configuration. As depicted in FIG. 6A, the proximal retention member 332 can include two opposing longitudinal slits 337 and two laterally extendable protrusions 338. In some embodiments, the proximal retention member 332 may include four slits 337 and four laterally extendable protrusions 338. The slits 337 can extend through a wall of the tubular body 331. In another embodiment, the slits 337 may extend partially through the wall of the tubular body 331 and be configured to tear when the proximal retention member 332 is transitioned from the straightened configuration to the expanded configuration. In the expanded configuration, the laterally extendable protrusions 338 extend laterally or radially outward from the tubular body 331 and form a "V" or "U" shape. During manufacture of the stent member 330, the laterally extendable protrusions 338 may be pre-formed in the expanded configuration, such as by exposing the laterally extendable protrusions 338 to heat when in the expanded configuration. The proximal retention member 332 may automatically transition from the straightened configuration to the expanded configuration because of material memory when the proximal retention member 332 is unrestricted. For example, during insertion of the drainage stent delivery system 300, a guidewire disposed within a lumen of the stent member 330 may straighten the proximal retention member 332 to allow insertion of the drainage stent delivery system 300 into a patient. When the drainage stent delivery system 300 is in a desired location, the guidewire may be removed, which may allow the proximal retention member 332 to automatically transition from the straightened configuration to the expanded configuration.

Figure 7A:
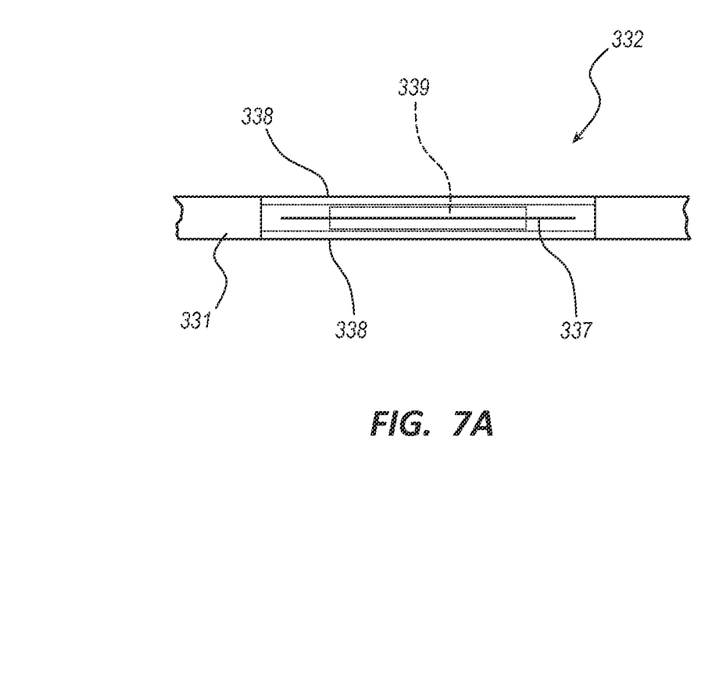
FIG. 7A is a side view of a portion of the drainage stent delivery system of FIG. 5 with another embodiment of the proximal retention member in a straightened configuration.
Figure 7B:
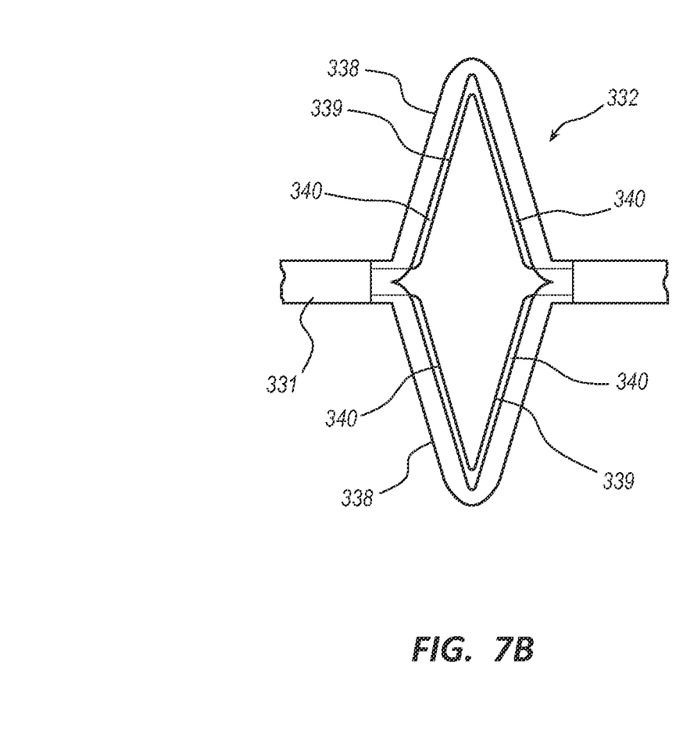
FIG. 7B is a side view of the portion of the drainage stent delivery system of FIG. 7A with the proximal retention member in an expanded configuration.

In another embodiment, shown in FIGS. 7A and 7B, the proximal retention member 332 may include a resilient insert 339 configured to transition the proximal retention member 332 from the straightened configuration to the expanded configuration. As depicted, the insert 339 can include struts 340 configured to support and laterally extend the laterally extendable protrusions 338 when the proximal retention member 332 is transitioned from the straightened configuration to the expanded configuration as shown in FIG. 7B. The insert 339 may comprise a shape memory material (e.g., metal or metal alloy), such as nickel titanium alloy, copper aluminum nickel alloy, iron manganese silicon alloy, copper zinc aluminum alloy, etc.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

References to approximations are made throughout this specification, such as by use of the term "substantially." For each such reference, it is to be understood that, in some embodiments, the value, feature, or characteristic may be specified without approximation. For example, where qualifiers such as "about" and "substantially" are used, these terms include within their scope the qualified words in the absence of their qualifiers.

Similarly, in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

The invention claimed is:

1. A drainage stent delivery system comprising:
   a proximal member;
   a distal member; and
   a coupling member comprising:
      a first connector having a non-round shape and coupled to the proximal member;
      a second connector having the non-round shape and coupled to the distal member; and
      a telescoping connector slidingly coupled to the first connector and the second connector and having the non-round shape,
   wherein when the proximal member is coupled to the distal member, the first connector and the second connector are rotationally fixed such that rotation of the proximal member causes equal rotation of the distal member, and
   wherein the proximal member is uncoupled from the distal member by proximal displacement of the telescoping connector.

2. The drainage stent delivery system of claim 1, wherein the distal member is a drainage stent.

3. The drainage stent delivery system of claim 1, wherein the coupling member further comprises:
   a release wire coupled to the telescoping connector, wherein a distal portion of the release wire extends distally from the telescoping connector; and
   a suture releasably coupled to the distal member and the distal portion of the release wire.

4. The drainage stent delivery system of claim 1, wherein the non-round shape is any one of a group consisting of an oval shape, an egg shape, a tear drop shape, and a polygonal shape.

5. The drainage stent delivery system of claim 4, wherein the polygonal shape is any one of a group consisting of a triangular shape, a rectangular shape, a square shape, a pentagonal shape, and a hexagonal shape.

6. The drainage stent delivery system of claim 1, wherein the distal member comprises an expandable retention member comprising opposing laterally extendable protrusions.

7. The drainage stent delivery system of claim 6, wherein the laterally extendable protrusions are collapsed when the drainage stent delivery system is in an insertion configuration and are expanded when the stent delivery system is in a draining configuration.

8. The drainage stent delivery system of claim 6, wherein the distal member comprises opposing longitudinal slits disposed between the laterally extendable protrusions.

9. The drainage stent delivery system of claim 6, wherein the retention member comprises a resilient element configured to extend the laterally extendable protrusions.

10. The drainage stent delivery system of claim 9, wherein the resilient element comprises a shape memory material.

11. The drainage stent delivery system of claim 10, wherein the shape memory material is a nickel-titanium alloy.

12. A drainage stent delivery system comprising:
   a proximal member;
   a distal member; and
   a coupling member comprising:
      a first connector having a non-round shape and coupled to the proximal member;
      a second connector having the non-round shape and coupled to the distal member; and
      a telescoping connector slidingly coupled to the first connector and the second connector and having the non-round shape,
   wherein when the proximal member is coupled to the distal member, a distal end of the first connector abuts a proximal end of the second connector, and the first connector and the second connector are rotationally fixed by the telescoping connector such that rotation of the proximal member causes equal rotation of the distal member.

13. The drainage stent delivery system of claim 12, wherein the distal member is a drainage stent.

14. The drainage stent delivery system of claim 12, wherein the coupling member further comprises:
   a release wire coupled to the telescoping connector, wherein a distal portion of the release wire extends distally from the telescoping connector; and a suture releasably coupled to the distal member and the distal portion of the release wire.

15. The drainage stent delivery system of claim 12, wherein the non-round shape is any one of a group consisting of an oval shape, an egg shape, a tear drop shape, and a polygonal shape.

16. The drainage stent delivery system of claim 15, wherein the polygonal shape is any one of a group consisting of a triangular shape, a rectangular shape, a square shape, a pentagonal shape, and a hexagonal shape.

* * * * *